`United States Patent` [19]

Mahabadi

[11] Patent Number: 5,164,282

[45] Date of Patent: * Nov. 17, 1992

[54] PROCESSES FOR THE PREPARATION OF TONERS

[75] Inventor: Hadi K. Mahabadi, Mississauga, Canada

[73] Assignee: Xerox Corporation, Stamford, Conn.

[*] Notice: The portion of the term of this patent subsequent to Aug. 27, 2008 has been disclaimed.

[21] Appl. No.: 339,539

[22] Filed: Apr. 17, 1989

[51] Int. Cl.⁵ .................. G03G 9/00; G03G 5/00; C08J 00/00; C08F 2/00
[52] U.S. Cl. .................... 430/109; 430/137; 524/849; 526/201
[58] Field of Search ............. 430/137, 109; 524/849; 526/201

[56] References Cited

U.S. PATENT DOCUMENTS

| | | | |
|---|---|---|---|
| 3,183,208 | 5/1965 | Jurgeleit | 526/201 X |
| 3,819,597 | 6/1974 | Richards | 526/193 |
| 4,339,337 | 7/1982 | Tricot et al. | 252/62.54 |
| 4,415,644 | 11/1983 | Tamaki et al. | 430/137 X |
| 4,486,559 | 12/1984 | Murata et al. | 523/486 |
| 4,680,200 | 7/1987 | Sole | 427/213.34 |
| 4,702,988 | 10/1987 | Fukumoto et al. | 430/137 |
| 4,833,060 | 5/1989 | Nair et al. | 430/137 |
| 4,835,084 | 5/1989 | Nair et al. | 430/137 |
| 4,912,010 | 3/1990 | Mori et al. | 430/109 X |
| 5,043,404 | 8/1991 | Mahabadi et al. | 526/194 |

FOREIGN PATENT DOCUMENTS 1493393 11/1977 United Kingdom ............... 524/849

*Primary Examiner*—Marion E. McCamish
*Assistant Examiner*—Stephen C. Crossan
*Attorney, Agent, or Firm*—E. O. Palazzo

[57] ABSTRACT

A process for the preparation of toner particles which comprises mixing at least one resin monomer with a polymerization initiator, a crosslinking component and a chain transfer component; effecting bulk polymerization until partial polymerization has been accomplished; mixing with the aforementioned partially polymerized product pigment or dye particles, thereby forming an organic phase; dispersing the organic phase in water containing a stabilizing component whereby there is obtained a suspension of toner particles in water; and polymerizing the toner suspension.

40 Claims, No Drawings

PROCESSES FOR THE PREPARATION OF TONERS

BACKGROUND OF THE INVENTION

This invention is generally directed to processes for the preparation of toner compositions, and more specifically semi-suspension polymerization processes. In one specific embodiment, the present invention is directed to semi-suspension polymerization processes for the economical preparation of toners with, for example, an average diameter of from about 5 to about 25 microns, wherein a mixture of monomer or comonomers, a polymerization initiator, a crosslinking component and a chain transfer component are bulk polymerized until partial polymerization is accomplished, for example from about 10 to about 40 percent of monomer or comonomers is converted to a polymer, followed by adding to the formed partially polymerized polymer pigments, or dyes optional additives such as charge control materials, low molecular weight waxes such as polypropylene, or polyethylene, and the like, and mixing with, for example, a high shear mixer to obtain a homogeneous organic mixture, subsequently dispersing the resulting organic mixture in water containing a stabilizing component, which dispersing can be accomplished, for example, by a high shear mixer, transferring the resulting suspension to a reactor, and effecting polymerization thereof, followed by optional washing, and drying. The toner composition obtained can be optionally blended with surface additives, which may function as flow aids, such as colloidal silicas and the like.

Toners have been prepared generally by fusion mixing of pigments (colorants), charge control agents and other additives into thermoplastic resins to disperse them uniformly therein. In view of the high viscosity of the mixture, a considerable amount of energy is needed to achieve uniform dispersion of pigments and other additives in the toner resin. The mixture is then cooled, followed by pulverization and classification into desired particle sizes and particle size distribution. It is well known that pulverization is an energy intensive step in this process. This preparation method is capable of producing considerably excellent toners, but requires the use of a several steps which are costly, energy intensive and are limited in certain respects. In the process for producing toners by pulverization, the material must be fragile so as to be readily pulverized to a certain extent. Therefore, some thermoplastic resins which are not fragile but have good fusing performance cannot be selected for the aforementioned prior art process. However, if the material is too fragile, it may be excessively micropulverized and, therefore, the fines portion of the particles must be uneconomically removed. These limitations become increasingly severe for smaller particle size toners. When a material with a low melting point is employed to improve fusing performance of the toner, fusion of such material may occur in the pulverizing device or the classifier.

Accordingly, in order to remove the drawbacks of the pulverization method, there have been proposed processes for producing toner wherein the toner particles were formed and correct particle size distribution produced in a reactor. These processes include dispersion polymerization, suspension polymerization, emulsion polymerization, and the like. Disclosed in U.S. Pat. No. 4,486,559 is the preparation of a toner composition by the incorporation of a prepolymer into a monomer/pigment mixture, followed by emulsion polymerization, see for example columns 4,5 and 8 of this patent. Also, methods of preparing toner, including suspension/dispersion polymerization, are detailed in columns 1 and 2 of this patent. In these processes, the pigment and additives such as charge control components are added to a monomer, or comonomers prior to polymerization. Particle formation is achieved by the dispersion of the pigmented monomer, or comonomers in a continuous phase such as water, and the droplets of pigmented monomers are then polymerized to form toner particles. One advantage of these processes as compared to many other methods is the elimination of fusion mixing (Banbury/extruder) and pulverization classification processing. Nevertheless, it is difficult with these processes to accomplish polymerization of pigmented monomer droplets in a diameter range of 5 to 25 microns with a narrow distribution of particle diameter of, for example, 1.3. Also, suspension failure is common with these processes especially when monomer droplet diameter is less than 50 microns and as polymerization proceeds in the sticky region (10 to 40 percent conversion). Further, it is difficult to conduct the polymerization of pigmented monomer droplets since, for example, it is well known that polymerization of free radical type monomers are hindered, and many times prevented by the presence of various pigments, especially carbon black. Another disadvantage of these processes for the preparation of toners resides in the resulting poor dispersion of the pigment and other additives within particles which is believed to be caused by the lack of micromixing, that is the mixing within monomer droplet. Moreover, the prior art processess for the preparation of particles is costly, or not as economical as desired. These and other disadvantages are avoided or minimized with the semi-suspension polymerized toner process of the present invention.

As a result of a patentability search there were located U.S. Pat. No. 4,486,559, which discloses the incorporation of a prepolymer into a monomer toner mix followed by emulsion polymerization; U.S. Pat. No. 4,680,200 and U.S. Pat. No. 4,702,988, which illustrate emulsion polymerization.

Disclosed in copending application U.S. Ser. No. 341,454 filed Apr. 21, 1989 is a process for the preparation of polymeric particles which comprises mixing at least one monomer with a polymerization initiator, a crosslinking component and a chain transfer component; effecting bulk polymerization until from about 10 about 50 weight percent of the monomer has been polymerized; dispersing with a high shear mixer the aforementioned partially polymerized product in water containing a stabilizing component selected from a group consisting of non-ionic and ionic water soluble polymeric stabilizers to obtain a suspension of particles with an average diameter of from about 0.1 to about 5 microns in water; and polymerizing the resulting suspension wherein bulk and suspension polymerization is accomplished by heating at a temperature of from about 30° C. to about 200° C.

SUMMARY OF THE INVENTION

It is, therefore, an object of this invention to provide processes for the preparation of toner with many of the advantages illustrated herein.

In another object of the present invention there are provided simple and economical processes for the preparation of black and colored toners.

Another object of the present invention resides in simple and economical processes for the preparation of low cost, black and colored toners with narrow particle size distribution.

Further, another object of the present invention resides in simple and economical processes for the preparation of low cost, black and colored toners with an average particle size diameter of from about 5 to about 25 microns, and narrow particle size distribution.

Additionally, in another object of the present invention there are provided simple and economical processes for producing low cost, black and colored toner particles with an average particle size diameter of 5 to 25 microns, a narrow particle size distribution, high degree of pigment and other additives dispersion within the toner particles, and a higher degree of flexibility in controlling molecular weight and molecular weight distribution of the toner resin without use of pulverization/classification.

These and other objects of the present invention are accomplished by the provision of processes for the preparation of toners, and more specifically to semi-suspension polymerized toner processes in which a mixture of monomer or comonomers, a polymerization initiator, a crosslinking component and a chain transfer component is bulk polymerized until partial polymerization, that is for example from about 10 to about 40 percent of monomer or comonomers is converted to a polymer; thereafter mixing the partially polymerized product with pigments, optional charge control agents and other additives with, for example, a high shear homogenizer to form a uniform organic phase, dispersing the organic phase in water containing a stabilizing component with, for example, a high shear mixer to produce a narrow particle size toner suspension; and polymerizing the suspension product. The toner obtained can then be washed/dried and dry blended with surface flow aid additives.

More specifically, the process of the present invention is comprised of (1) mixing a monomer or comonomers with polymerization initiators, a crosslinking component and a chain transfer component; (2) effecting bulk polymerization by increasing the temperature of the mixture to from about 50° C. to about 120° C. until from about 10 to about 40 weight percent of monomer or comonomers has been polymerized; (3) mixing with the aforesaid partially polymerized monomer product pigments, charge control agents and other additive using a high shear mixer to formulate a uniform organic phase; (4) dispersing the organic phase into from 2 to about 5 times its volume of water containing from about 1 to about 5 weight percent of a stabilizing component to form a toner suspension with an average particle size of from about 5 to about 25 microns and a particle size distribution of from about 1.1 to about 1.3 using a high shear mixer; (5) transferring the resulting toner suspension to a reactor and polymerizing by increasing the process temperature to from about 55° to about 120° C. to complete the conversion of monomer, or comonomers to polymer product; (6) washing the product with water and/or an alcohol such as methanol; (7) separating polymer particles by, for example, filtration or centrifugation; (8) drying the toner particles obtained; and (9) optionally dryblending with flow additives such as colloidal silica, and/or charge control additives.

Also, the process of the present invention is directed to the preparation of black and colored toner particles with an average particle diameter of from about 5 microns to about 25 microns and with resin binders synthesized to have any desirable average molecular weight, for example a number average molecular weight of from about 5,000 to about 500,000, a weight average molecular weight, from about 10,000 to about 2,000,000, and any required molecular weight distribution, for example a molecular weight distribution with from about one to about four peaks. Further, the process of the present invention is directed to the preparation of black and colored toner particles of an average diameter of from about 5 microns to about 25 microns, a particle size distribution of from 1.1 to about 1.3 with the resin binder having a number average molecular weight in the range of 5,000 to about 100,000, and a weight average molecular weight of 25,000 to about 400,000; and a molecular weight distribution having one to 3 peaks.

In one embodiment of the present invention, there is provided a process for the preparation of toner particles which comprises mixing at least one resin monomer with a polymerization initiator, a crosslinking component and a chain transfer component; effecting bulk polymerization until partial polymerization is accomplished, that is for example from about 10 to about 40 weight percent of the monomer has polymerized; mixing with the aforementioned partially polymerized monomer product pigment or dye particles and charge enhancing component until a uniform organic phase is formed; dispersing the organic phase in water containing a stabilizing component whereby there is obtained a suspension of toner particles in water; and polymerizing the toner suspension. Another embodiment of the present invention is directed to a process for the preparation of toner particles which comprises mixing resin monomer, comonomers, or mixtures thereof with a polymerization initiator, a crosslinking component and a chain transfer component; effecting bulk polymerization until from about 10 to 40 weight percent of the monomer, comonomers, or mixtures thereof have been polymerized; mixing with the partially polymerized monomer product pigments or dyes and charge control materials until a uniform organic phase is formed; dispersing the organic phase in water containing a stabilizing component thereby obtaining a suspension of toner particles in water; polymerizing the toner suspension wherein there is formed a toner product; and subsequently washing and drying the toner particles.

The process of the present invention in another embodiment comprises (1) mixing a monomer or comonomers with polymerization initiator with the ratio of monomer or comonomers to initiator being from about 100/2 to about 100/20, a crosslinking component with the ratio of monomer or comonomers to crosslinking component being from about 100/0.1 to about 100/5 and a chain transfer component with the ratio of monomer or comonomers to the chain transfer component being from about 100/0.01 to about 100/1; (2) effecting bulk polymerization by increasing the temperature of the mixture to from about 50° C. to about 120° C. until from about 10 to about 40 weight percent of monomer or comonomers has been converted to a polymer or polymers having number average molecular weight of from 5,000 to about 50,000 and weight average molecular weight from about 10,000 to about 200,000; (3) mixing with the partially polymerized monomer product from about 5 to about 70 weight percent pigment and one to 5 weight percent charge control agent and other additives using a high shear mixer to form a uniform organic phase; (4) dispersing the uniform organic phase to from about 2 to about 5 times its volume water containing from about 1 to about 5 weight percent stabilizing component, preferably polyvinyl alcohol having weight average molecular weight of from 1,000 to about 10,000 to form toner suspension with the particle size from 5 to about 25 microns with particle size distribution from 1.1 to about 1.3 by using high shear mixer; (5) transferring the resulting toner suspension to a reactor and polymerizing the suspension by increasing the temperature to from about 55° C. to about 120° C. to allow the complete conversion of monomer or comonomers to polymer; (6) washing the product with equal volume of methanol and/or water for 3 to 5 times; (7) separating toner particles from water/methanol by means of filtration or centrifugation; (8) drying of the toner particles; and (9) dry blending of toner with required additives such as flow agent, and the like.

Illustrative examples of monomers or comonomers selected for the processes of the present invention and present in effective amounts as illustrated herein, for example, include: vinyl monomers of styrene and its derivatives such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutymaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and the like; and mixtures thereof.

Examples of initiator and present in effective amounts as illustrated herein, for example, selected for the process of the present invention include azo and diazo compounds such as azoisobutyronitrile, azodimethylvaleronitrile, azobiscyclohexanitrile, 2-methylbutyronitrile, diazoamine-azobenzene, mixtures thereof, and the like. The bulk polymerization temperature should be selected according to the initiator types. Generally, the molecular weight of polymer decreases as the amount of initiator or polymerization temperature increases. The bulk polymerization temperature, initiator types and concentration should be selected to obtain partially polymerized monomer with 10 to 40 percent polymer having weight average molecular weight in the range of 10,000 to about 200,000. This polymer will assist in the dispersion of pigment and also can coat the pigment particle and, therefore, minimize the inhibition effects of pigment on the suspension polymerization.

The copolymer should preferably be crosslinked to some extent to provide improved toner and/or image anti-offset characteristics. Examples of crosslinkers selected for the process of the present invention include compounds having two or more polymerizable double bonds. Specific examples of such compounds include: aromatic divinyl compounds such as divinylbenzene and divinylnaphthalene; carboxylic acid esters with two double bounds such as ethylene glycol diacrylate, ethylene glycol dimethylacrylate and like; divinyl compounds such as divinyl ether, divinyl sulfide, divinyl sulfone and the like. The crosslinking component should preferably be present in an amount of from about 0.1 to about 5 parts by weight in 100 parts by weight of monomer or comonomers mixture.

Stabilizer present in effective amounts as illustrated herein, for example, and selected for the process of the present invention include non-ionic and ionic water soluble polymeric stabilizers such as methyl cellulose, ethyl cellulose, hydroxypropyl cellulose, block copolymer such as Pluronic E87 available from BASF, the sodium salts of carboxyl methyl cellulose, polyacrylate acids and their salts, polyvinyl alcohol, gelatins, starches, gums, alginates, zein, casein and the like; and barrier stabilizers such as tricalcium phosphate, talc, barium sulfate and the like.

The chain transfer component selected functions to control molecular weight by inhibiting chain growth. Typical of chain transfer agents utilized for the process of the present invention are mercaptans such as laurylmercaptan, butylmercaptan and the like, or halogenated carbons such as carbon tetrachloride or carbon tetrabromide and the like. The chain transfer agent should preferably be present in an amount of from about 0.01 to about 1 weight percent of monomer or comonomers mixture.

Numerous well known suitable pigments can be selected as the colorant for the toner particles including, for example, carbon black, nigrosine dye, aniline blue, phthalocyanine derivatives, magnetites and mixtures thereof. The pigment, which is preferably carbon black, should be present in a sufficient amount to render the toner composition colored thereby permitting the formation of a clearly visible image. Generally, the pigment particles are present in amounts of from about 3 percent by weight to about 20 percent by weight, based on the total weight of the toner composition, however, lesser or greater amounts of pigment particles can be selected providing the objectives of the present invention are achieved.

When the pigment particles are comprised of magnetites, including those commercially available as Mapico Black ®, they are present in the toner composition in an amount of from about 10 percent by weight to about 70 percent by weight, and preferably in an amount of from about 10 percent by weight to about 30 percent by weight. Alternatively, there can be selected as pigment particles mixtures of carbon black or equivalent pigments and magnetites, which mixtures, for example, contain from about 6 percent to about 70 percent by weight of magnetitie, and from about 2 percent to about 15 percent by weight of carbon black. Particularly preferred as pigments are magnetites as they enable, for example, images with no toner spots for extended time periods exceeding the development of 100,000 images, which corresponds to about 400,000 imaging cycles for a panel containing four imaging members.

Also embraced within the scope of the present invention are colored toner compositions containing as pigments or colorants red, blue, green, brown, magenta, cyan, and/or yellow particles, as well as mixtures thereof. More specifically, with regard to the generation of color images utilizing the toner and developer compositions of the present invention, illustrative examples of magenta materials that may be selected include, for example, 2,9-dimethyl-substituted quinacridone and anthraquinone dye identified in the Color Index as CI 60710, CI Dispersed Red 15, a diazo dye identified in the Color Index as CI 26050, CI Solvent Red 10, Lithol Scarlett, Hostaperm, and the like. Illustrative examples of cyan materials that may be used as pigments include copper tetra-4 (octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, Sudan Blue, and the like; while illustrative examples of yellow pigments that may be selected include diarylide yellow 3,3-dichlorobenzidene acetoacetanilides, a monazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. These pigments are generally present in the toner composition in an amount of from about 2 weight percent to about 15 weight percent based on the weight of the toner resin particles.

Illustrative examples of optional charge enhancing additives present in various effective amounts, such as, for example, from about 0.1 to about 20 percent by weight, and preferably from about 1 to about 3 weight percent include alkyl pyridinium halides, such as cetyl pyridinium chlorides, reference U.S. Pat. No. 4,298,672, the disclosure of which is totally incorporated herein by reference, cetyl pyridinium tetrafluoroborates, quaternary ammonium sulfate, and sulfonate charge control agents as illustrated in U.S. Pat. No. 4,338,390, the disclosure of which is totally incorporated herein by reference; stearyl phenethyl dimethyl ammonium tosylates, reference U.S. Pat. No. 4,338,390, the disclosure of which is totally incorporated herein by reference; distearyl dimethyl ammonium methyl sulfate, reference U.S. Pat. No. 4,560,635, the disclosure of which is totally incorporated herein by reference; stearyl dimethyl hydrogen ammonium tosylate; and other known similar charge enhancing additives providing the objectives of the present invention are accomplished; and the like.

With further respect to the toner and developer compositions of the present invention, another optional component present includes the linear polymeric alcohol comprised of a fully saturated hydrocarbon backbone with at least about 80 percent of the polymeric chains terminated at one chain end with a hydroxyl group, which alcohol is represented by the following formula:

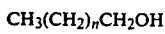

$$CH_3(CH_2)_n CH_2OH$$

wherein n is a number of from about 30 to about 300, and preferably of from about 30 to about 100, which alcohols are available from Petrolite Corporation. Particularly preferred polymeric alcohols include those wherein n represents a number of from about 30 to about 50. Therefore, in a preferred embodiment of the present invention the polymeric alcohols selected have a number average molecular weight as determined by gas chromatography of from about greater than 450 to about 1,400, and preferably of from about 475 to about 750. In addition, the aforementioned polymeric alcohols are present in the toner and developer compositions illustrated herein in various effective amounts, and can be added as uniformly dispersed internal, or as finely divided uniformly dispersed external additives. More specifically, the polymeric alcohols are present in an amount of from about 0.5 percent by weight to about 20 percent by weight, while as external additives the polymeric alcohols are present in an amount of from about 0.05 percent by weight to slightly less than about 5 percent by weight.

With further respect to the process of the present invention, the stabilizer on the surface of the toner particles can, if desired, be substantially removed by washing with an alcohol including, for example, methanol, or water. Separation of washed toner particles from solution can be achieved by selecting any known classical separation technique such as filtration, centrifugation and the like. Classical drying technique such as vacuum drying, freeze drying, spray drying, fluid bed drying and the like can be selected for drying the toner.

The following examples are being submitted to further define various species of the present invention. These examples are intended to be illustrative only and are not intended to limit the scope of the present invention. Also, parts and percentages are by weight unless otherwise indicated.

EXAMPLE I

To 150 grams of styrene were added 100 grams of butyl methacrylate and 20 grams of 2,2' azo-bis (2,4-dimethylbaleronitrile), which components were mixed until dissolved. This mixture was then bulk polymerized by heating in a two liter glass reactor to 55° C. by means of an oil bath while the mixture was stirred with a Teflon propeller until 27 percent of the comonomers were converted to polymer with a number average molecular weight of 13,000 and a weight average molecular weight of 28,000 as measured by gel permeation chromatography. To the comonomer/polymer mix were then added 20 grams of Regal 330 ® carbon black and 6 grams of cetyl pyridinium chloride followed by mixing with a Brinkmann PT456G high shear homogenizer with 10,000 revolutions per minute for 2 minutes to form a uniform organic phase. The uniform organic phase was then poured together with 1,000 milliliters of water containing 0.9 weight percent polyvinyl alcohol having a weight average molecular weight of 3,000, into a four liter stainless steel beaker. The beaker was placed in an ice bath and using a Brinkmann PT456G polytron homogenizer the mixture was then vigorously stirred at 10,000 revolutions per minute for 5 minutes to provide a microsuspension of toner particles in water. The suspension was then transferred to a 2 liter glass reactor equipped with a Teflon propeller with a stirring speed of 150 revolutions per minute and the content of the reactor was heated to 55° C. and controlled at that temperature by means of an oil bath. After four hours, the suspension polymerization was complete, and the resulting toner product was poured into two liters of hot water. The resulting diluted suspension was then stirred for 15 minutes. The supernatant liquid consisting of the diluted polyvinyl alcohol was decanted, fresh water was added and the mixture was stirred for 15 minutes to disperse the particles. This washing procedure was repeated four times with deionized water. After the final wash, the slurry was poured into a tray and vacuum dried to yield clean, dry individual toner particles. Using a scanning electron microscope, photomicrographs of the dry toner product were taken and evidenced an average particle size diameter of 6 microns. As measured by gel permeation chromatography, the number average molecular weight of the styrene butyl methacrylate toner resin was 23,000 and the weight average molecular weight was 67,000. The formed toner product was mixed with 0.3 weight percent of the colloidal silica (R972) to provide a toner with excellent flow characteristics.

Evaluation of the blocking tendency of the above prepared toner was conducted after permitting 20 grams of the toner to remain in a thermostat oven set at 55° C. for 24 hours, followed by allowing to cool to room temperature. No blocking, that is toner agglomeration, was observed for the above prepared toners.

Evaluation of fixing characteristics of the above prepared toner was performed by using the fixing unit of the Xerox Corporation 1075 TM apparatus. Initial fixing temperature of 140° C. and offset initiating temperature of 200° C. were measured for this toner. Print quality evidenced an excellent level of fix as measured by taber abrasion method (40 percent drop in optical density after abrasion test) with the initial optical density being 1.1 to 1.2 with no background or offset/smearing.

EXAMPLE II

The process of Example I was repeated except that the organic phase was dispersed in water containing 0.5 weight percent of polyvinyl alcohol. The resulting toner had an average particle diameter size of 9 microns. The other characteristics of the prepared toner were substantially equivalent to the toner of Example I.

EXAMPLE III

The process of Example I was repeated except that the organic phase was dispersed in water containing 0.25 weight percent polyvinyl alcohol. The resulting toner had an average particle size diameter of 12.5 microns. The other characteristics of the prepared toner were substantially equivalent to the toner of Example I.

EXAMPLE IV

The process of Example I was repeated except that the comonomer mixture was bulk polymerized until 15 weight percent of the monomer was converted to polymer. The resulting toner had an average particle size diameter of 5 microns. The other characteristics of the prepared toner were substantially equivalent to the toner of Example I.

EXAMPLE V

The process of Example I was repeated except that the comonomer mixture was bulk polymerized until 35 weight percent of the monomers was converted to polymer. The resulting toner had an average particle diameter size of 9.5 microns. The other characteristics of the prepared toner were substantially equivalent to the toner of Example I.

EXAMPLE VI

To 150 grams of styrene were added 100 grams of butyl methacrylate and 20 grams of 2,2' azobis, (2,4-dimethylvaleronitrile) which were mixed until dissolved. This mixture was bulk polymerized by heating in a two liter glass reactor to 75° C. by means of an oil bath while the mixture was stirred with a Teflon propeller until 25 weight percent of the comonomers was converted to polymer with a number average molecular weight of 6,000 and a weight average molecular weight of 13,000 as measured by gel permeation chromatography. To the comonomers/polymer mixture were then added 50 grams of Mapico Black magnetite, 2 grams of Ravon 5750 carbon black and one gram of the linear polymeric alcohol Unilin ®, available from Petrolite Corporation, with a number average molecular weight of 600, followed by mixing with a Brinkmann PT456G high shear homogenizer with 10,000 revolutions per minute for about 3 minutes. The resulting uniform organic phase was then poured together with 1,000 milliliters of water containing 0.9 weight percent polyvinyl alcohol, a weight average molecular weight of 3,000, into a four liter stainless steel beaker. The beaker was placed in an ice bath and using a Brinkmann PT456G polytron homogenizer the mixture was then vigorously stirred at 10,000 revolutions per minute for 5 minutes to form a microsuspension of toner particles in water. The suspension of toner was then transferred to a 2 liter parr reactor equipped with a magnetic stirrer, an aluminum block heater and cold water cooling. The suspension polymerization temperature was raised to 55° C. and held there for 2 hours, then the temperature is increased to 80° C. in 2 hours and held there for one hour, when it was then cooled to 25° C., and the toner product was poured into two liters of hot water. The resulting diluted suspension was stirred for 15 minutes. The supernatant liquid consisting of the diluted polyvinyl alcohol was decanted, fresh water was added and the resulting mixture was stirred for 15 minutes. This washing procedure was repeated four times. After the final wash, the slurry was poured into a tray and vacuum dried to yield clean, dry individual toner particles. Using a scanning electron microscope, photomicrographs of the above prepared dry toner were taken and evidenced an average particle size diameter of 7.5 microns. As measured by gel permeation chromatography, the number average molecular weight of the styrene-n-butyl methacrylate toner resin was 18,000, the weight average molecular weight was 96,000 and the molecular weight distribution evidenced two peaks. The toner product was mixed with 0.3 weight percent of the colloidal silica (R972) to provide a toner with excellent flowability.

Evaluation of the blocking tendency of this toner was accomplished by repeating the procedure of Example I, and the results indicated no blocking.

Evaluation of fixing characteristic was performed by using the fixing unit of the Xerox Corporation 9200 TM apparatus. Initial fixing temperature of 120° C. and offset initiating temperature of 220° C. were obtained for this toner. Print quality evidenced a very good fix level (only 20 percent drop in optical density after abrasion test) with the initial optical density being 1.2 to 1.25 with no background or offset/smearing.

EXAMPLE VII

The process of Example VI was repeated except that 1,000 milliliters of water containing one percent hydroxypropyl cellulose stabilizer was used. The resulting toner had an average particle size diameter of 18 microns. This toner was evaluated by repeating the procedure of Example VI and similar results were obtained.

EXAMPLE VIII

The process of Example VII was repeated except that 1,000 milliliters of water containing 2 weight percent hydroxypropyl cellulose stabilizer was used. The resulting toner had an average particle size of 10 microns. This toner was evaluated by repeating the procedure of Example VI and similar results were obtained.

EXAMPLE IX

The process of Example VI was repeated except that 1,000 milliliters of water containing 0.4 weight percent F87 Pluronic (BASF) stabilizer was used. The resulting product had an average particle size of 8 microns. This toner was evaluated by repeating the procedure of Example VI and similar results were obtained.

EXAMPLE X

To 218.2 grams of styrene monomer were added 101 grams of n-lauryl methacrylate monomer and 15 grams of azoisobutyronitrile initiator which were mixed until dissolved. This mixture was bulk polymerized by heating in a two liter reactor to 80° C. by means of an oil bath while the mixture was stirred with a Teflon propeller until 20 weight percent of the comonomers converted to polymer having a number average molecular weight of 12,000 and a weight average molecular weight of 25,000 as measured by gel permeation chromatography. To the comonomer/polymer mixture were then added 50 grams of Mapico Black magnetite and 2 grams of Ravon 5750 carbon black, and mixed using IKA ultra-Turran G45M high shear homogenizer with 10,000 revolutions per minute for 3 minutes. The product was then poured along with 1,100 milliliters of water containing 0.5 weight percent polyvinyl alcohol having a weight average molecular weight of 3,000 into a four liter stainless steel beaker. The beaker was placed in an ice bath and using IKA Ultra-Turran G45M high shear mixer with 10,000 revolutions per minute for 5 minutes the mixture was stirred to produce a microsuspension of toner particles in water. The suspension was then transferred to a 2 liter glass reactor equipped with a Teflon propeller with stirring speed of 150 revolutions per minute. The reactor was heated to 90° C. and controlled at that temperature by means of an oil bath. After 4 hours, the suspension polymerization was completed and the toner product was poured into two liters of hot water and stirred for 15 minutes. The supernatant liquid consisting of the diluted polyvinyl alcohol was decanted, fresh water was added and the mixture was stirred for 15 minutes. This washing procedure was repeated four times. After the final wash, the slurry was poured into a tray and vacuum dried. Using a scanning electron microscope, photomicrographs of the dry toner were taken and evidenced an average particle size diameter of 6.5 microns. As measured by gel permeation chromatography, the number and weight average molecular weight of the styrene-n-lauryl methacrylate toner resin were 17,000 and 89,000 with two peaks in its molecular weight distribution. This toner was evaluated by repeating the procedure of Example VI and similar results were obtained.

EXAMPLE XI

The process of Example VI was repeated except that 20 grams of Hostaperm pink pigment was used. The resulting color toner had an average particle size of 12 microns. This toner was evaluated by repeating the procedure of Example VI and similar results were obtained.

In U.S. Pat. No. 5,043,404, entitled Semi-Suspension Polymerization Processes, the disclosure of which is totally incorporated herein by reference, there is illustrated a process for the preparation of polymeric particles which comprises mixing at least one monomer with a polymerization initiator, a crosslinking component and a chain transfer component; effecting bulk polymerization until partial polymerization results; dispersing the aforementioned partially polymerized monomer product in water containing a stabilizing component to obtain a suspension of particles in water and polymerizing the resulting suspension.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of toner particles with an average diameter from about 5 to about 25 microns, which comprises mixing from about 1 to about 10 monomers with a polymerization initiator, a crosslinking component and a chain transfer component; effecting bulk polymerization until from about 10 to about 40 weight percent of the monomer has polymerized; mixing with the aforementioned partially polymerized product pigment or dye particles until an organic phase is formed; dispersing the organic phase in water containing a stabilizing component selected from the group consisting of nonionic and ionic water soluble polymeric stabilizers, polyvinyl alcohol, gelatins, starches, gums, alginates, zein, and casein, which dispersion is accomplished with a high shear homogenizer, whereby there is obtained a suspension of toner particles in water; and polymerizing the toner suspension, and wherein bulk and suspension polymerization are accomplished by heating to a temperature of from about 50° to 100° C.

2. A process in accordance with claim 1 wherein the pigment particles are cyan, magenta, yellow, red, blue, green, brown black, or mixtures thereof.

3. A process in accordance with claim 1 wherein the number and weight average molecular weight of the polymer prepared in the bulk polymerization step is from about 5,000 to about 50,000 and from about 10,000 to about 300,000, respectively.

4. A process in accordance with claim 1 wherein the molecular weight distribution of the toner polymer resin in the toner particles has one peak, or a plurality of peaks.

5. A process in accordance with claim 1 wherein the particle size and particle size distribution of the resulting toner is controlled by the mixing time, stabilizing concentration, and the viscosity of the organic phase during dispersion of the organic phase in water containing stabilizing component.

6. A process in accordance with claim 1 wherein the monomer or comonomers are selected from vinyl monomers.

7. A process in accordance with claim 1 wherein the monomer(s) are styrene derivatives thereof; monocarboxylic acids and the derivatives thereof; dicarboxylic acids with a double bond and the derivatives thereof; vinyl esters; vinyl ketones; vinyl naphthalene; unsaturated mono-olefins; vinylidene halides; and mixtures thereof.

8. A process in accordance with claim 1 wherein the monomer(s) are styrene, α-methylstyrene, p-chlorostyrene, acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile or acrylamide; maleic acid, monobutyl maleate, or dibutylmaleate; vinyl chloride, vinyl acetate or vinyl benzoate; vinyl methyl ketone and vinyl ether ketone; and vinyl ethyl ether or vinyl isobutyl ether; isobutylene; vinylidene chloride; N-vinyl pyrrole; or mixtures thereof.

9. A process in accordance with claim 8 wherein the polymerization initiator is azoisobutyronitrile, azodimethylvaleronitrile, azobiscyclohexanitrile, 2-methylbutyronitrile, diazoamine-azobenzene, or mixtures thereof.

10. A process in accordance with claim 1 wherein the polymerization initiator is selected from the group consisting of azo, diazo compounds, and mixtures thereof.

11. A process in accordance with claim 1 wherein the crosslinking component is selected from the group consisting of compounds having two or more polymerizable double bonds; and divinyl compounds.

12. A process in accordance with claim 1 wherein the crosslinking component is selected from the group consisting of ethylene glycol diacrylate, ethylene glycol dimethyacrylate, divinyl ether, divinyl sulfite, divinyl sulfone, divinylbenzene, and divinylnaphthalene.

13. A process in accordance with claim 1 wherein the chain transfer component is selected from a group consisting of mercaptans and halogenated hydrocarbons.

14. A process in accordance with claim 1 wherein the chain transfer agent is carbon tetrachloride, butylmercaptan, or laurylmercaptan.

15. A process in accordance with claim 1 wherein the stabilizing component is selected from a group consisting of methyl cellulose, ethyl cellulose, hydroxypropyl cellulose, block copolymers, and barrier stabilizers.

16. A process in accordance with claim 1 wherein the stabilizer is tricalcium phosphate, talc or barium sulfate.

17. A process in accordance with claim 1 wherein the pigment is carbon black, magnetites, nigrosine dye, aniline blue 2,9-dimethyl-substituted quinacridone, an anthraquinone dye, a diazo dye, Cl Solvent Red 10, Lithol Scarlet, or Hostaperm Pink.

18. A process in accordance with claim 1 wherein the pigment is copper tetra-4 (octadecyl sulfonamido) phthalocyanine, X-copper phthalocyanine, Cl Pigment Blue, Anthrathrene Blue, Sudan Blue, diarylide yellow 3,3-dichlorobenzidene acetoacetanilides, a monazo pigment, Cl Solvent Yellow 16, a nitrophenyl amine sulfonamide, Cl Dispersed Yellow 33, 2,5-dimethoxy-4-sulfonanilide phenylazo-4'-chloro-2,5-dimethoxy acetoacetanilide, or Permanent Yellow FGL.

19. A process in accordance with claim 2 wherein the toner is blended with surface additives.

20. A process in accordance with claim 19 wherein the additives are comprised of colloidal silica.

21. A process in accordance with claim 1 wherein the toner contains a linear polymeric alcohol.

22. A process in accordance with claim 1 wherein there is added to the partially polymerized mixture a polyhydroxy compound.

23. A process for the preparation of toner particles with an average diameter of from about 5 to about 20 microns, which comprises mixing resin monomer, comonomers, or mixtures thereof and wherein from 1 to about 10 monomers are selected with a polymerization initiator, a crosslinking component and a chain transfer component; effecting bulk polymerization until from about 10 to about 40 weight percent of the monomer, comonomers, or mixtures thereof have been polymerized; mixing with the partially polymerized product pigments or dyes thereby forming an organic phase; dispersing the organic phase in water containing a stabilizing component selected from the group consisting of nonionic and ionic water soluble polymeric stabilizers, polyvinyl alcohol, gelatins, starches, gums, alginates, zein, and casein, which dispersion is accomplished with a high shear homogenizer, thereby obtaining a suspension of toner particles in water; polymerizing the toner suspension whereby there are formed toner particles; and subsequently washing and drying the toner particles, and wherein bulk and suspension polymerization are accomplished by heating to a temperature of from about 50° to 120° C.

24. A process in accordance with claim 23 wherein the dried toner particles are blended with flow aid additives, and have incorporated therein charge enhancing additives.

25. A process in accordance with claim 24 wherein the resulting toner particles are of an average diameter of from about 5 to about 25 microns.

26. A process in accordance with claim 24 wherein the charge enhancing additive is an alkyl pyridinium halide, a quaternary ammonium sulfate, or a sulfonate.

27. A process in accordance with claim 26 wherein the charge additive is stearyl phenethyl dimethyl ammonium tosylate, distearyl dimethyl ammonium methyl sulfate, stearyl dimethyl hydrogen ammonium tosylate cetyl pyridinium chlorides, or cetyl pyridinium tetrafluoroborates.

28. A process in accordance with claim 23 wherein the suspension of toner particles in water is formed in a container and then transferred to a reactor.

29. A process in accordance with claim 23 wherein the dispersion of the organic phase in the water containing stabilizing component is accomplished with a high shear homogenizer.

30. A semisuspension polymerization process for obtaining toner particles with an average diameter of from about 5 to about 25 microns, and wherein from 1 to about 10 monomers are selected, which comprises mixing at least one resin monomer with a polymerization initiator, a crosslinking component and a chain transfer component; effecting bulk polymerization until from about 10 to about 40 weight percent of the said monomer has been polymerized; mixing with the aforementioned partially polymerized product pigment or dye particles, thereby forming an organic phase; dispersing the organic phase in water containing a stabilizing component selected from the group consisting of nonionic and ionic water soluble polymeric stabilizers, polyvinyl alcohol, gelatins, starches, gums, alginates, zein, and casein, which dispersion is accomplished with a high shear homogenizer, whereby there is obtained a suspension of toner particles in water; and polymerizing the toner suspension.

31. A process in accordance with claim 30 wherein there are obtained toner particles with an average diameter of from about 6 to about 18 microns.

32. A process for the preparation of toner particles with an average diameter of from about 5 to about 25 microns and wherein from 1 to about 10 monomers are selected by semisuspension polymerization which comprises mixing at least one resin monomer with a polymerization initiator, a crosslinking component and a chain transfer component; effecting bulk polymerization until from about 10 to about 40 weight percent of the monomer has polymerized; mixing with the aforementioned partially polymerized product pigments or dye particles until an organic phase is formed; dispersing the organic phase in water containing a stabilizing component selected from the group consisting of nonionic and ionic water soluble polymeric stabilizers, polyvinyl alcohol, gelatins, starches, gums, alginates, zein, and casein, which dispersion is accomplished with a high shear homogenizer, whereby there is obtained a suspension of toner particles in water; and polymerizing the toner suspension.

33. A process which comprises mixing a monomer or comonomer with a polymerization initiator, a crosslinking component, and a chain transfer component; (2) effecting bulk polymerization by increasing the temperature of the aforementioned mixture from about 50° C. to about 100° C. until from about 10 to about 40 weight percent of monomer of comonomers have been polymerized; (3) mixing with the aforementioned partially polymerized monomer product pigments and optional additive components with a high shear mixer thereby formulating a uniform organic phase; (4) dispersing the organic phase into water containing a stabilizing component selected from the group consisting of nonionic and ionic water soluble polymeric stabilizers, polyvinyl alcohol, gelatins, starches, gums, alginates, zein, and casein, thereby forming a toner suspension; (5) transferring the resulting toner suspension to a reactor and polymerizing by increasing the process temperature to about 55° to about 120° C. thereby completing the conversion of a monomer or comonomers to a polymer product; (6) washing the resulting product; (7) separating the polymer particle; and (8) drying the toner particles obtained.

34. A process in accordance with claim 33 wherein the additives include charge enhancing components.

35. A process in accordance with claim 33 wherein the organic phase is dispersed into from about 2 to about 5 times its volume of water which contains from about 1 to about 5 weight percent of stabilizing component and wherein the dispersion is accomplished with a high sheer mixer.

36. A process in accordance with claim 33 wherein the washing of the product is accomplished with water and/or an alcohol.

37. A process in accordance with claim 33 wherein the polymer particles are separated by filtration.

38. A process in accordance with claim 33 wherein there are obtained toner particles with an average particle size of from about 5 to about 25 microns.

39. A process in accordance with claim 33 wherein there are obtained toner particles with an average particle size of from about 6 to about 18 microns.

40. A process in accordance with claim 33 wherein there is optionally blended with the resulting toner particles flow additives and/or charge enhancing additives.

* * * * *